United States Patent
Markwart et al.

(10) Patent No.: US 9,769,672 B2
(45) Date of Patent: Sep. 19, 2017

(54) ANONYMIZATION OF ASA/LSA REPOSITORY DATA

(71) Applicant: NOKIA SOLUTIONS AND NETWORKS OY, Espoo (FI)

(72) Inventors: Christian Markwart, Munich (DE); Ruediger Halfmann, Otterberg (DE)

(73) Assignee: Nokia Solutions And Networks OY, Espoo (FI)

( * ) Notice: Subject to any disclaimer, the term of this patent is extended or adjusted under 35 U.S.C. 154(b) by 0 days.

(21) Appl. No.: 14/911,552

(22) PCT Filed: Aug. 13, 2013

(86) PCT No.: PCT/EP2013/066878
§ 371 (c)(1),
(2) Date: Feb. 11, 2016

(87) PCT Pub. No.: WO2015/022016
PCT Pub. Date: Feb. 19, 2015

(65) Prior Publication Data
US 2016/0205561 A1    Jul. 14, 2016

(51) Int. Cl.
*H04W 16/14* (2009.01)
(52) U.S. Cl.
CPC .................. *H04W 16/14* (2013.01)
(58) Field of Classification Search
CPC . H04W 16/14; H04W 72/04; H04W 72/0453; H04W 16/10; H04W 28/16; H04W 72/1215; H04W 16/06; H04W 16/12; H04W 16/24
See application file for complete search history.

(56) References Cited

U.S. PATENT DOCUMENTS

| | | | | |
|---|---|---|---|---|
| 8,311,554 | B2* | 11/2012 | Abedi | H04W 16/14 370/230 |
| 8,824,382 | B2* | 9/2014 | Shu | H04W 28/26 370/329 |
| 2009/0059856 | A1* | 3/2009 | Kermoal | H04W 16/14 370/329 |
| 2010/0098012 | A1* | 4/2010 | Bala | H04L 5/001 370/329 |
| 2012/0140689 | A1* | 6/2012 | Pelletier | H04W 76/048 370/311 |

(Continued)

FOREIGN PATENT DOCUMENTS

WO     2012/072118 A1    6/2012

OTHER PUBLICATIONS

International Search Report for International Application No. PCT/EP2013/066878, mailed May 15, 2014, 4 pages.

(Continued)

*Primary Examiner* — Liton Miah
(74) *Attorney, Agent, or Firm* — Brake Hughes Bellermann LLP

(57) ABSTRACT

It is provided a method, including mapping, based on a predefined zone mapping table, a share status of a geographically defined zone to a cell of a communication network; identifying, based on a predefined cell mapping table, a cell device related to the cell; and triggering issuing a command to the cell device to modify an activity status of a predefined radio resource in the cell depending on the share status.

18 Claims, 7 Drawing Sheets

(56) References Cited

U.S. PATENT DOCUMENTS

2013/0316710 A1\* 11/2013 Maaref ................ H04W 16/10
455/436
2015/0036509 A1\* 2/2015 Lopes .................. H04W 16/10
370/241.1

OTHER PUBLICATIONS

Report on ASA Concept, FM(12)084 Annex 47; May 10, 2012; 11 pages.
ETSI; TR 103 113 v1.1.1_0.0.5 (Feb. 2013); Reconfigurable Radio Systems (RRS); System Reference Document; Mobile Broadband Services in the 2 300 MHz—2 400 MHz Frequency Band under Licensed Shared Access Regime.
RSPG11-392 Final; Report on Collective Use of Spectrum (CUS) and other spectrum sharing approaches; Radio Spectrum Policy Group 2011; Nov. 2011; 38 pages.

\* cited by examiner

ANONYMIZATION OF ASA/LSA REPOSITORY DATA

This application is a national stage entry of PCT Application No. PCT/EP2013/066878, filed Aug. 13, 2013, entitled "ANONYMIZATION OF ASA/LSA REPOSITORY DATA" which is hereby incorporated by reference in its entirety.

FIELD OF THE INVENTION

The present invention relates to an apparatus, a method, and a computer program product related to radio communication networks. More particularly, the present invention relates to an apparatus, a method, and a computer program product related to shared access.

BACKGROUND OF THE INVENTION

Abbreviations
3GPP 3$^{rd}$ Generation Partnership Project
ALC ASA/LSA Control
ALR ASA/LSA Repository
ARIMF ASA/LSA Reservation Zone Information Mediation Function
ASA Authorized Shared Access
BS Base Station
C Cell
CDMA Code Division Multiple Access
CUS Collective Use of Spectrum
EDGE Enhanced Data rates for Global Evolution
EU European Union
KPI Key Performance Indicator
LSA Licensed Shared Access
LTE™ Long Term Evolution
LTE-A™ Long Term Evolution-Advanced
MNO Mobile Network Operator
NM Network Management
NMS Network Management System
OAM Operation Administration & Maintenance
OMS OAM System
OSS Operations Support System
RAN Radio Access Network
RSPG Radio Spectrum Policy Group
UE User Equipment
UMTS Universal Mobile Telecommunication System
WCDMA Wideband Code Division Multiplex Access
WiFi™ Wireless Fidelity This invention is related to ASA (authorized shared access) spectrum, also known as LSA (licensed shared access) spectrum (in the following for simplicity named ASA/LSA), to extend the capacity for wireless access, in particular for broadband wireless access. ASA/LSA is a third and complementary way of authorizing spectrum, in addition to licensed and license-exempt (unlicensed), see e.g. EU RSPG: Report on Collective Use of Spectrum (CUS) and other spectrum sharing approaches: RSPG11-392. ASA/LSA spectrum is typically owned by an Incumbent (primary user) who allows other licensed operators (secondary user) to use this spectrum for their purpose. ASA/LSA allows support of different operators by using separated ASA/LSA resources. Each ASA/LSA resource is defined by a spectrum, a location where this spectrum is used, and further properties like corresponding usage times. ASA/LSA may be employed in any kind of accordingly enabled base stations (e.g. Macro, Pico and Femto base stations).

In conventional mobile networks, spectrum utilization and allocation is performed via static configurations based on network planning data of a Mobile Network Operator MNO. With the introduction of ASA/LSA it is not longer possible to stay with these static configurations because ASA/LSA spectrum needs to be evacuated according to predefined terms and conditions if requested by the incumbent (primary user). The principle of >>my spectrum-my usage>> will not hold any longer. In other words, the well known static spectrum allocation methods need to be complemented which leads to a paradigm change in mobile communication industry. In addition to the traditional exclusive spectrum assignment there is now also a new method where (in some regions) certain parts of the spectrum may no longer be exclusively assigned to a single operator but jointly assigned to several operators with the obligation to use them collectively.

A main characteristic of ASA/LSA is that the incumbent, i.e. the ASA/LSA spectrum owner may reserve an ASA/LSA resource for own usage. Such reservations could be defined by static rules (e.g. a defined zone and/or time where the spectrum is used by the incumbent) or dynamic rules (e.g. evacuation or re-offering of spectrum depending on the spectrum usage of the incumbent). In both cases, zones where spectrum use under ASA/LSA is not allowed are defined by spectrum, geographical area, time and transmitter/receiver characteristics. Furthermore the evacuation and activation lead time, this is the time between the initialization of a request to free up or use ASA/LSA spectrum and the finalization of its execution, may be defined as another input parameter to the Mobile Network Operator MNO (licensee).

Taking everything into account, ASA/LSA requires two basic mechanisms in the Radio Access Network RAN:
 Preparation task: configuration of all necessary parameters at Base Stations BS; and
 Steering task: activation and de-activation of ASA/LSA spectrum at Base Stations BS.

Both mechanisms are typically based on operation and maintenance tasks using a push or pull mechanism between the Base Stations and the Operations Support System OSS infrastructure. FIG. 1 shows how the preparation and steering tasks are embedded in the ASA/LSA concept.

Before ASA/LSA spectrum can be used in a RAN the preparation task as shown in FIG. 1 has to be finished. Based on mobile network planning data (e.g. Base Station locations, propagation models, performance measurement data (KPIs), and configuration details of a mobile operator's Radio Access Network (RAN)) and ASA/LSA license definitions (e.g. geographical ASA/LSA license area, ASA/LSA spectrum, usage and lead times, and ASA/LSA reservation areas with respective transmitter/receiver characteristics), the Base Stations and their respective cells are identified for the use of the ASA/LSA spectrum. In a second step the Mobile Operator determines all cell configuration parameters for the ASA/LSA spectrum and deploys these configuration data to the respective Base Stations. As a result the Mobile Network is now prepared to use the ASA/LSA spectrum in the ASA/LSA license area.

The steering task provides methods to activate and de-activate the ASA/LSA spectrum at the BS according to the negotiated rules between the MNO (ASA/LSA licensee) and the incumbent operator ("Incumbent"). There are different methods and options possible how the Incumbent informs the MNO about spectrum ASA/LSA requests or offerings, but common to all of them is that the status of ASA/LSA spectrum availability is stored at the ASA/LSA Repository (ALR). From there, the ASA/LSR spectrum is activated/deactivated e.g. via ALC, ASA/LSR spectrum controller, and optional nodes, as shown in FIG. 1.

It is well known that network planning data, especially location and propagation information of Base Stations are of high value, and MNOs are not willing to share this information with other parties. The same applies to the Incumbent and its details on ASA/LSA spectrum usage. As by today the ASA/LSA concept does not include a solution which allows avoiding sharing of deployment data between LSA/ASA parties.

SUMMARY OF THE INVENTION

It is an object of the present invention to improve the prior art. In detail, it is an object to overcome at least some of the problems arising ASA/LSA.

According to a first aspect of the invention, there is provided an apparatus, comprising mapping means adapted to map, based on a predefined zone mapping table, a share status of a geographically defined zone to a cell of a communication network; identifying means adapted to identify, based on a predefined cell mapping table, a cell device related to the cell; triggering means adapted to trigger issuing a command to the cell device to modify an activity status of a predefined radio resource in the cell depending on the share status.

In the apparatus, the radio resource may comprise at least one of a frequency, a time slot, and a code.

In the apparatus, the activity status may be at least one of transmitting on the radio resource being allowed in the cell, transmitting on the radio resource being forbidden in the cell; receiving on the radio resource being allowed in the cell, receiving on the radio resource being forbidden in the cell; a maximum transmit power level of the radio resource allowed for transmitting in the cell; a minimum receive power level of the radio resource allowed for being received in the cell; a tilt of a transmit antenna providing the radio resource to the cell, and a tilt of a receive antenna receiving the radio resource from the cell.

In the apparatus, the cell device may be one of a base station of the communication network and a terminal device of the communication network.

In the apparatus, at least one of: the share status may be received from a repository device, and the share status may be generated based on a predefined event.

According to a second aspect of the invention, there is provided an apparatus, comprising mapping processor adapted to map, based on a predefined zone mapping table, a share status of a geographically defined zone to a cell of a communication network; identifying processor adapted to identify, based on a predefined cell mapping table, a cell device related to the cell; triggering processor adapted to trigger issuing a command to the cell device to modify an activity status of a predefined radio resource in the cell depending on the share status.

In the apparatus, the radio resource may comprise at least one of a frequency, a time slot, and a code.

In the apparatus, the activity status may be at least one of transmitting on the radio resource being allowed in the cell, transmitting on the radio resource being forbidden in the cell; receiving on the radio resource being allowed in the cell, receiving on the radio resource being forbidden in the cell; a maximum transmit power level of the radio resource allowed for transmitting in the cell; a minimum receive power level of the radio resource allowed for being received in the cell; a tilt of a transmit antenna providing the radio resource to the cell, and a tilt of a receive antenna receiving the radio resource from the cell.

In the apparatus, the cell device may be one of a base station of the communication network and a terminal device of the communication network.

In the apparatus, at least one of: the share status may be received from a repository device, and the share status may be generated based on a predefined event.

According to a third aspect of the invention, there is provided a method, comprising mapping, based on a predefined zone mapping table, a share status of a geographically defined zone to a cell of a communication network; identifying, based on a predefined cell mapping table, a cell device related to the cell; triggering issuing a command to the cell device to modify an activity status of a predefined radio resource in the cell depending on the share status.

In the method, the radio resource may comprise at least one of a frequency, a time slot, and a code.

In the method, the activity status may be at least one of transmitting on the radio resource being allowed in the cell, transmitting on the radio resource being forbidden in the cell; receiving on the radio resource being allowed in the cell, receiving on the radio resource being forbidden in the cell; a maximum transmit power level of the radio resource allowed for transmitting in the cell; a minimum receive power level of the radio resource allowed for being received in the cell; a tilt of a transmit antenna providing the radio resource to the cell, and a tilt of a receive antenna receiving the radio resource from the cell.

In the method, the cell device may be one of a base station of the communication network and a terminal device of the communication network.

The method may further comprise at least one of: receiving the share status from a repository device, and generating the share status based on a predefined event.

The method may be a method of shared access.

According to a fourth aspect of the invention, there is provided a computer program product comprising a set of instructions which, when executed on an apparatus, is configured to cause the apparatus to carry out the method according to the third aspect. The computer program product may be embodied as a computer-readable medium or directly loadable into a computer.

According to some embodiments of the invention, at least one of the following advantages may be achieved:

- No Network details as BS locations, cell configurations or internal usage need to be provided to the ALR or involved parties
- Exchange of information is restricted to a minimum, in particular the rather static assignment of resources does not allow to draw conclusions on the current load (or even overload) of a MNO's network at a certain location and/or time. Such information is business secrecy and therefore MNOs are not willing to share such kind of information with a $3^{rd}$ party.
- ASA/LSA Reservation Zones need to be known only by the Incumbent and the MNO, sharing the ASA/LSA spectrum
- No negotiations between multiple MNOs in multi-operator scenarios are required. Bilateral negotiations between the owner of the ASA/LSA license area and each MNO are sufficient.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

According to some embodiments of the invention, a network function is introduced that maps and translates detailed ASA/LSA spectrum usage information of a Radio Access Network or an Incumbent Network to global ASA/LSA resource allocation information that are exchanged and stored in the ASA/LSA Repository and vice versa in order to protect network detail information of an Incumbent and an ASA/LSA licensee from being known by the respective other party.

Figure 2:
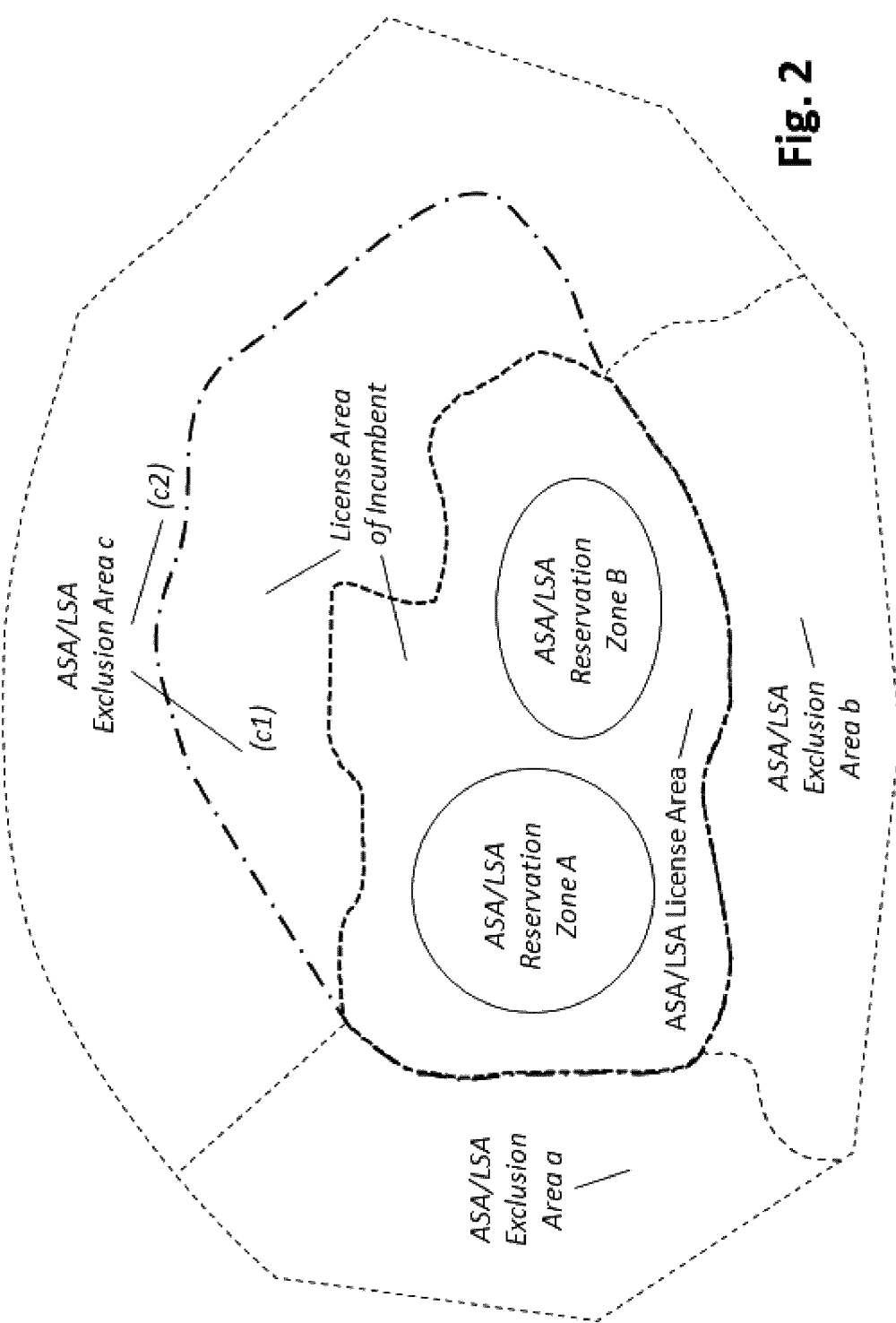
FIG. 2 shows a license area of the Incumbent with basic resource elements of ASA/LSA.

In a $1^{st}$ step the basic definitions for ASA/LSA are introduced to describe the different ASA/LSA resources. FIG. 2 shows the 3 basic ASA/LSA resource elements and how these resource elements are used. In FIG. 2, the respective resource elements (license area, ASA/LSA license area, ASA/LSA exclusion area, and ASA/LSA reservation zone) are shown as an overlay layer which may be overlaid on a geographical map.

ASA/LSA License Area: The ASA/LSA License Area defines the geographical area, where the Incumbent shares the contracted ASA/LSA spectrum with the ASA/LSA Licensee. The ASA/LSA license area is a whole or a part of the license area (the border of which is shown by a dashed-dotted line in FIG. 2) of the Incumbent owning the ASA/LSA spectrum. The ASA/LSA License Areas are unique in an ASA/LSA framework, but may overlap in a geographical area. The latter aspect allows supporting multiple ASA/LSA Licensees.

Figure 3:
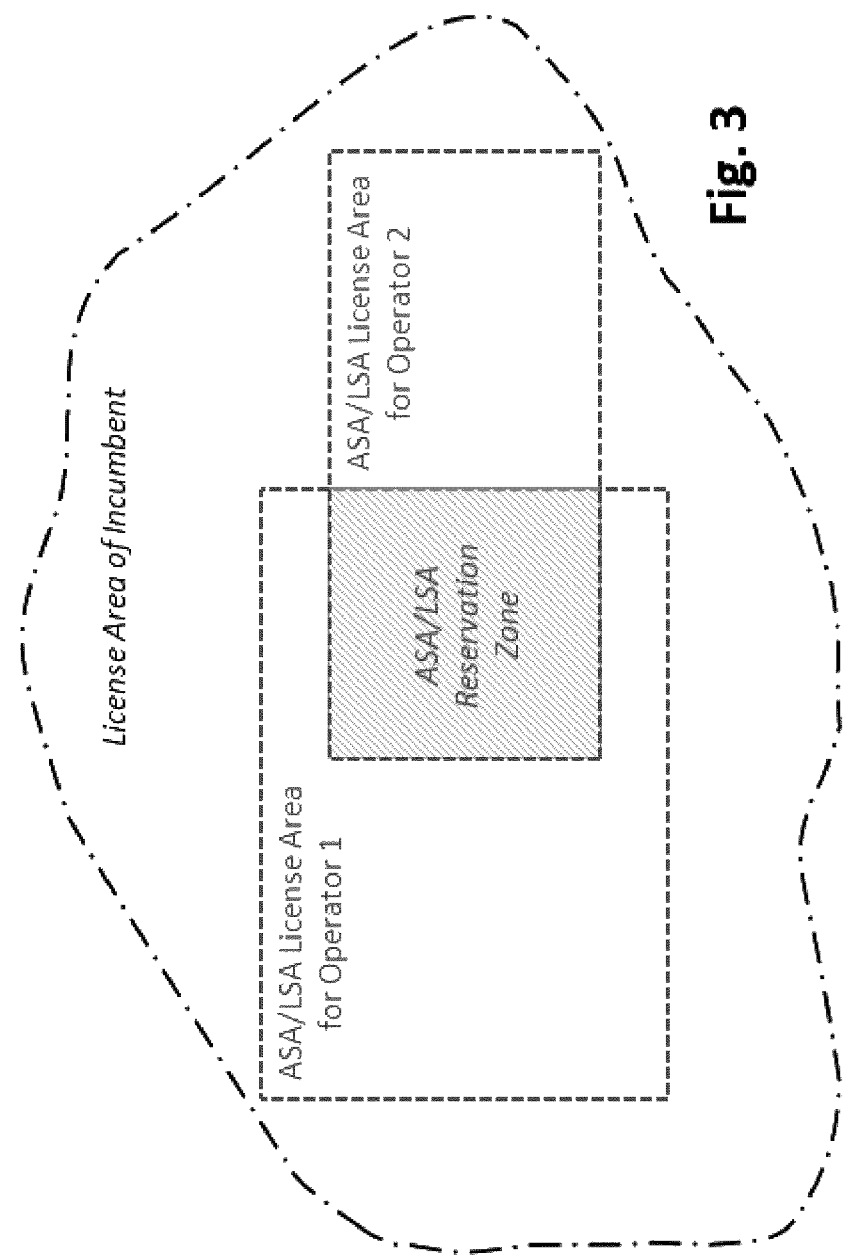
FIG. 3 shows a license area of the Incumbent with a ASA/LSA reservation zone.

Note that overlapping ASA/LSA License Areas given to different ASA/LSA Licensees may require additional measures to guarantee an exclusive ASA/LSA spectrum use to each party, e.g. overlapping ASA/LSA License Areas use different ASA/LSA spectrum parts of the Incumbent (split ASA/LSA spectrum) or the overlapping geographical area are defined as ASA/LSA Reservation Zone that is either used By ASA/LSA Licensee 1, or ASA/LSA Licensee 2, or the Incumbent. A principle is shown in FIG. 3, wherein the ASA/LSA reservation zone in the middle may be used by either of operator 1, operator 2, and Incumbent.

ASA/LSA Exclusion Area: The ASA/LSA Exclusion Area defines geographical areas surrounding the ASA/LSA License Area. To cover use cases with multiple ASA/LSA Licensees and/or ASA/LSA License Areas near a country border or similar situations the ASA/LSA Exclusion Area may be split into several ASA/LSA Exclusion Sub-Areas, e.g. ASA/LSA Exclusion Sub-Areas a, b and c in FIG. 2. For more complex scenarios, some ASA/LSA exclusion sub-areas, e.g. the ASA/LSA exclusion Sub-Area c may be split into zones, such as 2 zones c1 and c2. In this example, ASA/LSA Exclusion zone c1 defines the area between the License Area of the incumbent and the border of the ASA/LSA License Area and zone c2 the other part of the Exclusion Sub-Area c not covered by c1. ASA/LSA Exclusion (Sub-)Areas and Zones are unique per ASA/LSA Licensee and ASA/LSA spectrum block of an Incumbent.

ASA/LSA Reservation Zone: The ASA/LSA Reservation Zone defines a geographical area inside the ASA/LSA License Area. ASA/LSA Reservation Zones define areas where the Incumbent or a $3^{rd}$ party uses the ASA/LSA spectrum permanently or on demand. Details of the usage are part of the agreement between Incumbent and ASA/LSA Licensee.

A data model based on meta data using the three basic ASA/LSA resource elements ASA/LSA License Area, Exclusion Area and Reservation Zone is sufficient to protect details of the ASA/LSA spectrum usage of Incumbent and ASA/LSA Licensees, even if multiple ASA/LSA Licensees are supported and are introduced to the ASA/LSA Repository.

According to some embodiments of the invention, each or both of the Incumbent and the ASA/LSA Licensee(s) that share(s) the ASA/LSA spectrum introduce(s) an adaptation function to their respective wireless network that maps the meta-data stored in the ASA/LSA Repository to its own network configuration details.

Figure 4:
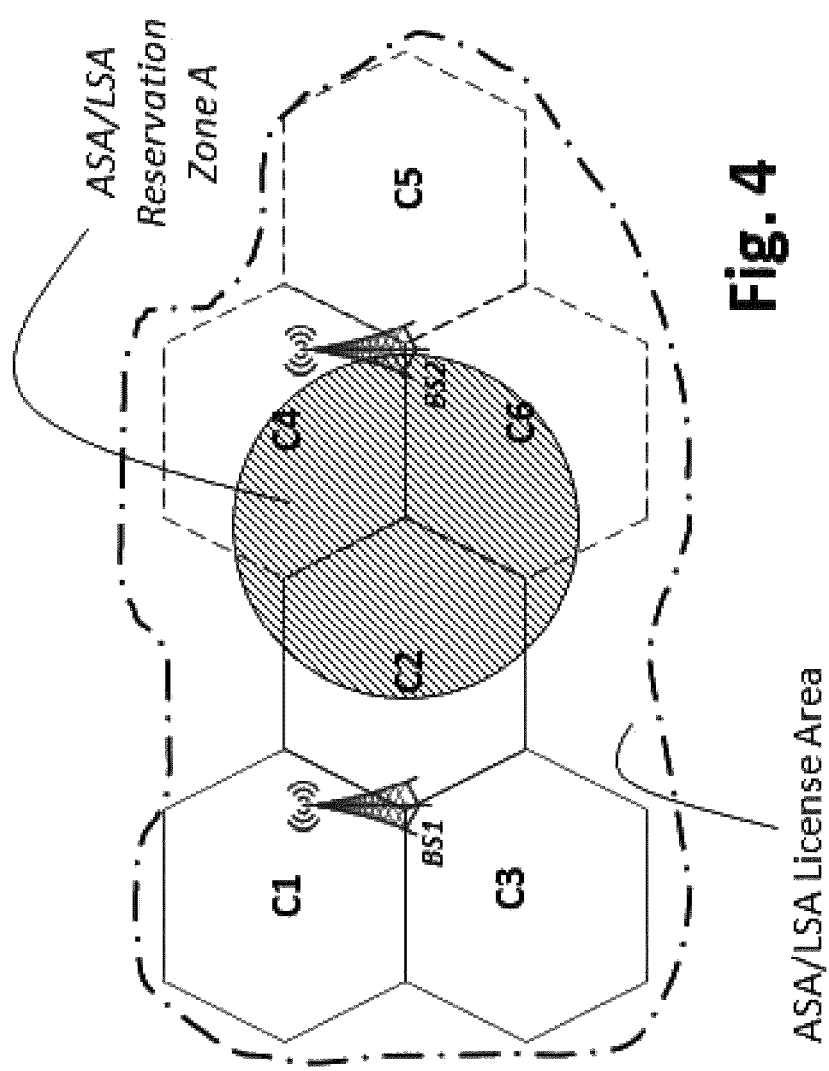
FIG. 4 shows a map on which a radio network of an operator and an ASA/LSA license area are overlaid.

FIG. 4 shows a map on which a radio network of an operator indicated by cells C1 to C6 with base stations BS1 and BS2 serving cells C1 to C3 and C4 to C6, respectively, and an ASA/LSA license area with a ASA/LSA reservation zone A are overlaid. FIG. 4 illustrates an example how a Mobile Network Operator MNO may use ASA/LSA spectrum to extend the capacity of an existing mobile network within an ASA/LSA license area.

The Base Stations of the Radio Access Network of the MNO (BS1 and BS2 in FIG. 4) are preconfigured to use ASA/LSA spectrum (preparation task) and how to react on ASA/LSA spectrum evacuation or offer requests for the predefined ASA/LSA Reservation Zone A, initiated by the incumbent (steering task). For the preparation task, according to FIG. 1 and FIG. 4, the operator uses the input for the ASA/LSA spectrum, including the ASA/LSA Reservation Zone definitions from the ALR and the propagation data of the RAN network to start a network planning for the ASA/LSA spectrum to determine the ASA/LSA cells (C1, C2, C3, C4, C5 and C6 in FIG. 4) and their configuration parameters for BS1 and BS2. The cells using the ASA/LSA spectrum (C1, C2, C3 of BS1 and C4, C5, C6 of BS2 in FIG. 2) are configured with these parameters via the OAM system of the Mobile Network Operator MNO. As a result the mobile network is ready to use the ASA/LSA spectrum, but the ASA/LSA spectrum use is still deactivated.

Depending on the contract, Incumbent may activate/deactivate ASA/LSA resource usage in the ASA/LSA license area, or only activate/deactivate reservation of a ASA/LSA reservation zone in the license area, while the resource in the ASA/LSA license area outside the ASA/LSA reservation zone is permanently allowed to be used by the licensee. According to some embodiments of the invention, an ASA/LSA spectrum evacuation/offer of the Incumbent is mapped to an ASA/LSA Reservation Zone A activation and de-activation, respectively. Cells C1, C3 of BS1 and C5 of BS2 may be activated immediately (or may be kept activated, depending on whether permanent usage is allowed or not), because these cells are inside the ASA/LSA License Area and not affected by the Reservation Zone A. On the other hand, before cell C2 of BS1 and cells C4, C6 of BS2 are allowed to use the ASA/LSA spectrum, the ALC needs to get aware of the status of the ASA/LSA Reservation Zone A. If the ASA/LSA Reservation Zone A is de-activated C2, C4 and C5 may be activated, if ASA/LSA Reservation Zone A is activated C2, C4 and C5 need to be deactivated. For example, ALC may retrieve the status of the ASA/LSA Reservation zone A from the ALR, and/or it may maintain the status of the ASA/LSA Reservation zone A from previous indications of status changes of this reservation zone, and/or a corresponding indication may be provided with the activation/de-activation message.

Please note that cell deactivation is used as a general term to describe that the transmitter for the affected ASA/LSA cell is switched off or another measure is taken to fulfill the definition for an activated ASA/LSA Reservation Zone, e.g. reducing power or/and antenna tilt to reduce ASA/LSA cell size. Also, the corresponding receiving parameters may be accordingly adapted.

As mentioned hereinabove, detailed planning data of a wireless network are of high value and need to be protected. In other words the ASA/LSA License Area, Exclusion Area and Reservation Zones as defined in step 1 are used at the ALR level and need to be transformed for the mobile network of the other contracting operator (licensee). This requires an additional function ARIMF (ASA/LSA Reservation Zone Information Mediation Function) either at the ALC, or OSS, or BS, or a new system in-between. The additional function has to mediate the ASA/LSA Reservation Zone activation and de-activation information to the ASA/LSA spectrum de-activation and activation information for the cells affected by the ASA/LSA reservation zone.

Figure 1:
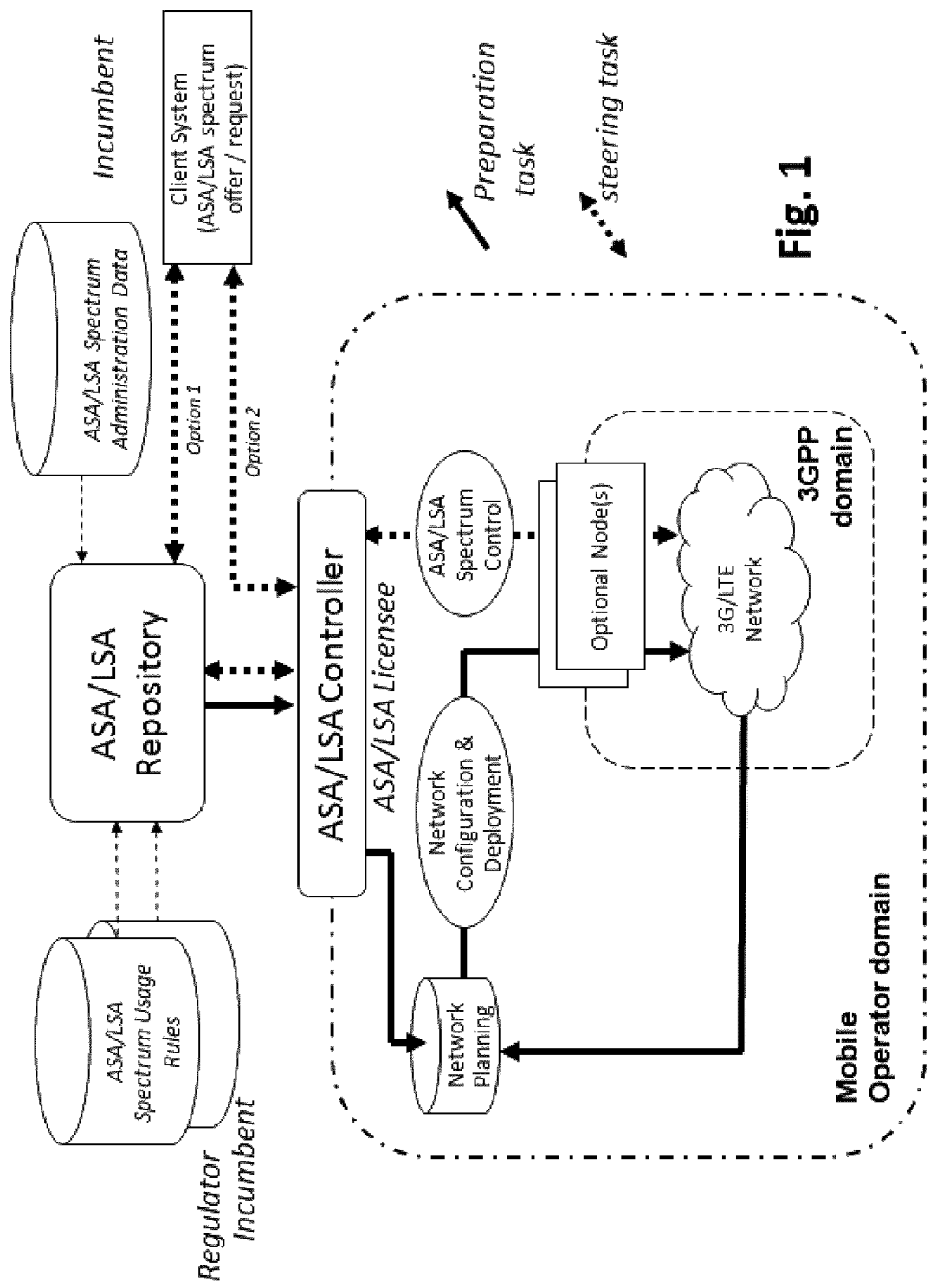
FIG. 1 shows a conventional ASA/LSA enabled system.

According to FIG. 1, the information on cells that overlap with an ASA/LSA reservation zone are derived as output of the network planning process. These data have to be provided to the ARIMF (in the example of FIG. 4, these data may be: C2 of BS1 and C4 and C6 of BS2 are overlapping with ASA/LSA reservation zone A).

Figure 5:
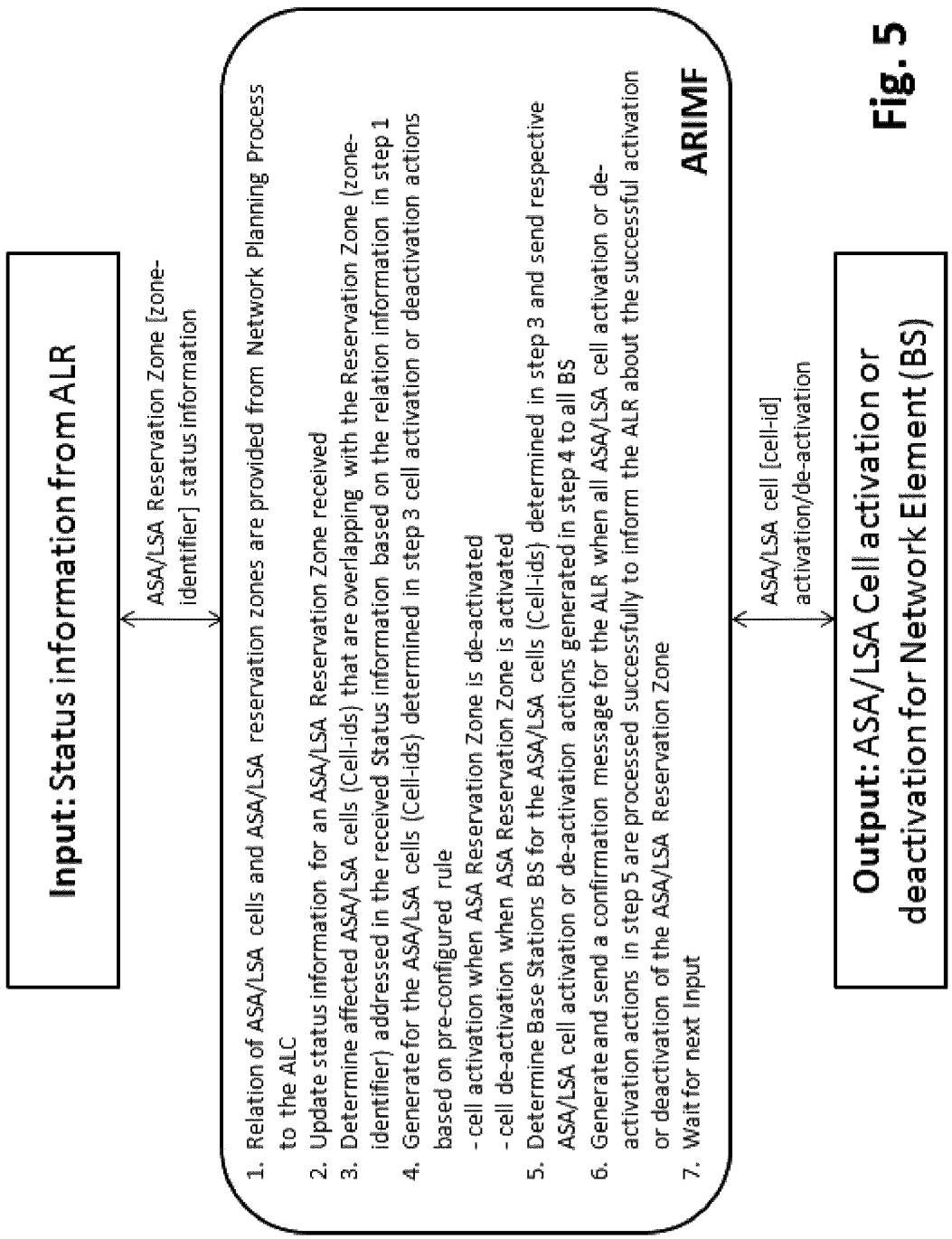
FIG. 5 shows a ARIMF according to an embodiment of the invention.

According to embodiments of the invention, ARIMF may process every status change for an ASA/LSA Reservation Zone as described in FIG. 5, i.e. when an ASA/LSA Reservation Zone is activated or de-activated by an Incumbent request. In FIG. 5, step 1 belongs to the preparation tasks, and steps 2 to 6 belong to the steering tasks. Typically, the routine steps back from step 7 to step 2.

In some embodiments, the ASA/LSA reservation zone definitions allow the overlapping of different ASA/LSA reservation zones. For example the whole ASA/LSA license area may be considered as a single ASA/LSA reservation zone. Thus, ARIMF may activate/deactivate ASA/LSA resource usage upon corresponding spectrum evacuation request/offer from the Incumbent (ALR). This ASA/LSA reservation zone may comprise additionally ASA/LSA reservation sub-zones, which overlap at least with the ASA/LSA reservation zone. For the ASA/LSA reservation sub-zones a separate activation/de-activation may be performed. For overlapping ASA/LSA reservation zones and/or ASA/LSA reservation sub-zones the ARIMF has to check with every ASA/LSA reservation zone or sub-zone status change for the cells belonging to the addressed ASA/LSA reservation zone or sub-zone the new status according to following rule—the ASA/LSA spectrum use for the cell is activated if the status of all ASA/LSA reservation zones and sub-zones where the cell belongs to is de-activated deactivated if the status of at least one ASA/LSA reservation zone or sub-zone where the cell belongs to is activated Even if the method to protect ASA/LSA spectrum usage detail data is described for a mobile network (i.e. a licensee), it can be also used with slightly modifications at the Incumbent side to protect the usage specifics in the License Area of the Incumbent. Needed modifications are: The ARIMF function needs to be installed in the Incumbent trusted network area, and the logic is inversed, i.e. the Incumbent is allowed to use the spectrum in the geographical area defined by the ASA/LSA Reservation Zone when the ASA/LSA Reservation Zone is activated, the ASA/LSA spectrum cannot be used when the ASA/LSA Reservation Zone is de-activated.

An ARIMF according to some embodiments of the invention may work also well when multiple operator support is required for ASA/LSA. In such cases the ASA/LSA License area of an MNO A may be defined for other Operators as ASA/LSA exclusion zone, or, as according to FIG. 3, as ASA/LSA reservation zone.

Figure 6:
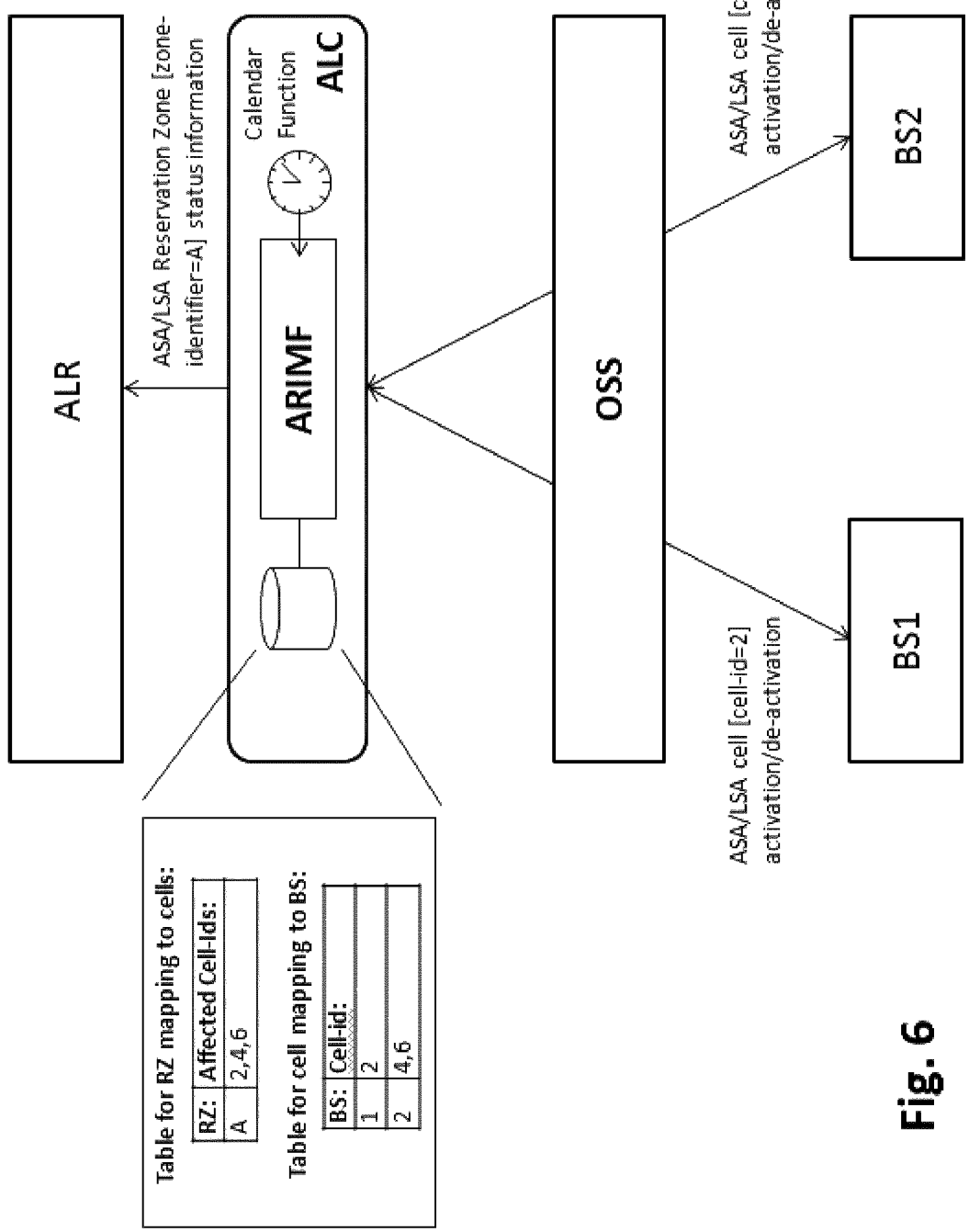
FIG. 6 shows a ARIMF according to an embodiment of the invention.

FIG. 6 shows an implementation example where the ARIMF is implemented inside the ALC for an Incumbent and a Mobile Network Operator that shares a defined ASA/LSA spectrum inside a geographical area as defined in FIG. 4. The Incumbent has an agreement with the MNO to use the ASA/LSA spectrum inside the ASA/LSA Reservation Zone A for a special event once per year at a fixed date and to use the ASA/LSA spectrum inside the ASA/LSA license and outside the ASA/LSA Reservation Zone A permanently.

The Mobile Network, especially the configuration and cell layout has been provided to the ARIMF by a Network Planning System owned by the MNO. The information about the relation of the ASA/LSA Reservation Zone A and the affected cells with the cell-id 2, 4, 6 and the BS of the cells for the communication details is deployed from the Network Planning System to the ALC or ARIMF where the information are stored, e.g. as simple tables as shown in FIG. 6. Additionally, a calendar function is used to trigger the ASA/LSA reservation Zone A activation at the fixed date and the deactivation at the end of the event. At the begin and end of the event, ASA/LSA resource is activated and de-activated in cells with cell-id 2, 4, and 6, e.g. via the OSS. Correspondingly, the ALR is updated when the affected cells with the cell-id 2, 4, 6 are de-activated or activated successfully. In this case, ALR is updated by an information that ASA/LSA Reservation Zone A is used/not used any more, without providing any identification of the involved cells. The ARIMF function which may be a part of the ALC works as described in FIG. 5.

Figure 8:
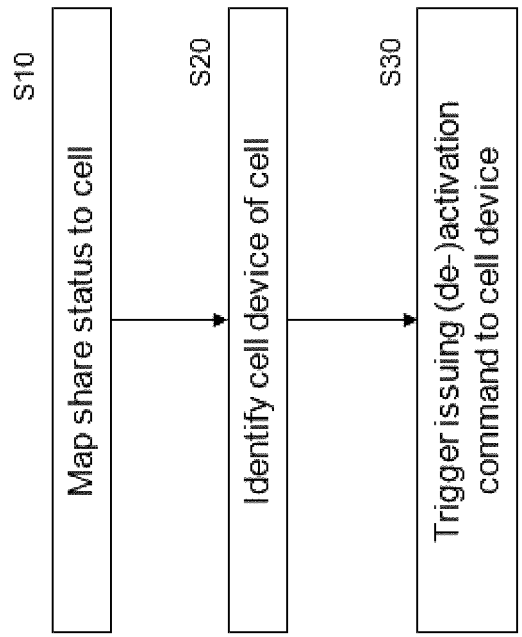
FIG. 8 shows a method according to an embodiment of the invention.
Figure 7:
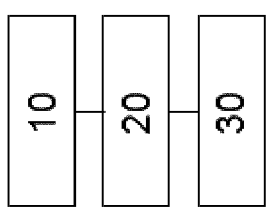
FIG. 7 shows an apparatus according to an embodiment of the invention.

FIG. 7 shows an apparatus according to an embodiment of the invention. The apparatus may be a mediation device such as a ARIMF, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises mapping means 10, identifying means 20, and triggering means 30.

The mapping means 10 maps a share status of a geographically defined zone to a cell of a communication network (S10). The mapping is based on a predefined zone mapping table. The share status may be received, e.g. from a repository, or it may be generated based on a predefined event.

The identifying means 20 identifies, based on a predefined cell mapping table, a cell device related to the cell (S20). The cell device may be a base station or a terminal providing base station functionality. According to the cell mapping table, it is indicated that the cell device serves the cell.

The triggering means 30 triggers issuing a command to the cell device to modify an activity status of a predefined radio resource in the cell depending on the share status (S30). That is, the radio resource may be activated or deactivated. This may be achieved by switching on/off or by modifying the extent of the cell, e.g. by adapting the power or by setting the antenna tilt of an antenna connected to the cell device for serving the cell. The radio resource may be at least one of a radio frequency, a time slot, and a code, or a combination thereof.

Figure 9:
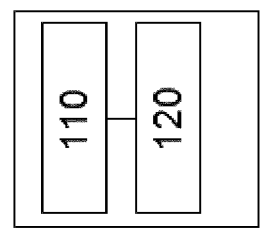
FIG. 9 shows an apparatus according to an embodiment of the invention.

FIG. 9 shows an apparatus according to an embodiment of the invention. The apparatus comprises at least one processor 110, at least one memory 120 including computer program code, and the at least one processor, with the at least one memory and the computer program code, being arranged to cause the apparatus to at least perform the method according to FIG. 8.

Embodiments of the invention may be employed in a 3GPP network of any generation where ASA/LSA is employed. They may be employed also in other networks with shared access like CDMA, EDGE, UMTS, LTE, LTE-A, WiFi networks, etc. A cell device may be a base station of the corresponding technology, such as a NodeB or eNodeB, or a part thereof serving a cell. It may also be a terminal which acts as a cell device for other terminals. A terminal (device) or a user equipment may be a mobile phone, a smart phone, a PDA, a laptop or any other terminal which may be attached to the respective network.

Embodiments of the invention are explained with respect to sharing a frequency (spectrum). In some embodiments, instead or in addition to the frequency, one or more time slots and/or one or more codes may be shared. Frequency, time slot, and code are summarized as radio resource in the present application.

It was explained that an activation/deactivation of ASA/LSA may be based on a predefined time. In some embodiments, activation/deactivation may be based on a predefined event, as may be contractually agreed between Incumbent and licensee (e.g. a certain load of one or both operators in the respective area). In these cases, a detection means should be provided to detect the event. Typically, the result of the detecting should be available to both parties.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on a different software, or some or all of the entities may be based on the same software.

According to the above description, it should thus be apparent that exemplary embodiments of the present invention provide, for example a mediation device such as a ASA/LSA reservation zone information mediation function device (e.g. ARIMF), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising at least one processor, at least one memory including computer program code, and the at least one processor, with the at least one memory and the computer program code, being arranged to cause the apparatus associated with a first communication network to at least perform:
   obtain, from the first communication network, information of a cell layout of the first communication network;
   obtain, from a repository, information of a geographically defined reservation zone, wherein an incumbent shares, according to authorized shared access, spectrum available in the geographically defined reservation zone with a plurality of communication networks including the first communication network;
   determine a zone mapping table which maps the geographically defined reservation zone to at least one cell of the first communication network, thereby avoiding a need of the first communication network to reveal its cell layout information to the incumbent or other communication network;
   obtain, from the repository, a spectrum usage status of the geographically defined reservation zone;

map, based on the zone mapping table, the geographically defined reservation zone to at least one cell of the first communication network;
identify, based on a predefined cell mapping table, at least one cell device related to the at least one cell; and
trigger issuing a command to the at least one cell device to modify an activity status of a predefined radio resource in the at least one cell depending on the spectrum usage status.

2. The apparatus according to claim 1, wherein the radio resource comprises at least one of:
a frequency;
a time slot; and
a code.

3. The apparatus according to claim 1, wherein the activity status is at least one of:
transmitting on the radio resource being allowed in the cell;
transmitting on the radio resource being forbidden in the cell;
receiving on the radio resource being allowed in the cell;
receiving on the radio resource being forbidden in the cell;
a maximum transmit power level of the radio resource allowed for transmitting in the cell;
a minimum receive power level of the radio resource allowed for being received in the cell;
a tilt of a transmit antenna providing the radio resource to the cell; and
a tilt of a receive antenna receiving the radio resource from the cell.

4. The apparatus according to claim 1, wherein:
the at least one cell device is one of:
a base station of the communication network; and
a terminal device of the communication network.

5. The apparatus according to claim 1, wherein at least one of:
the spectrum usage status is received from a repository device; and
the spectrum usage status is generated based on a predefined event.

6. The apparatus according to claim 1, wherein the computer program code further causing the apparatus associated with the first communication network to:
inform the repository about the spectrum usage status of the first communication network in the geographically defined reservation zone.

7. A method, comprising:
obtaining, from a first communication network, information of a cell layout of the first communication network;
obtaining, from a repository, information of a geographically defined reservation zone, wherein an incumbent shares, according to authorized shared access, spectrum available in the geographically defined reservation zone with a plurality of communication networks including the first communication network;
determining a zone mapping table which maps the geographically defined reservation zone to at least one cell of the first communication network, thereby avoiding a need of the first communication network to reveal its cell layout information to the incumbent or other communication network;
obtaining, from the repository, a spectrum usage status of the geographically defined reservation zone;
mapping, based on the zone mapping table, the geographically defined reservation zone to at least one cell of the first communication network;
identifying, based on a predefined cell mapping table, at least one cell device related to the at least one cell; and
triggering issuing a command to the at least one cell device to modify an activity status of a predefined radio resource in the at least one cell depending on the spectrum usage status.

8. The method according to claim 7, wherein the radio resource comprises at least one of:
a frequency;
a time slot; and
a code.

9. The method according to claim 7, wherein the activity status is at least one of:
transmitting on the radio resource being allowed in the cell,
transmitting on the radio resource being forbidden in the cell;
receiving on the radio resource being allowed in the cell,
receiving on the radio resource being forbidden in the cell;
a maximum transmit power level of the radio resource allowed for transmitting in the cell;
a minimum receive power level of the radio resource allowed for being received in the cell; and
a tilt of a transmit antenna providing the radio resource to the cell, and a tilt of a receive antenna receiving the radio resource from the cell.

10. The method according to claim 7, wherein:
the at least one cell device is one of:
a base station of the communication network; and
a terminal device of the communication network.

11. The method according to claim 7, further comprising at least one of:
receiving the spectrum usage status from a repository device, and
generating the spectrum usage status based on a predefined event.

12. The method according to claim 7 and further comprising:
informing the repository about the spectrum usage status of the first communication network in the geographically defined reservation zone.

13. A computer program product embodied as a non-transitory computer-readable medium and comprising a set of instructions which, when executed on an apparatus, is configured to cause the apparatus to perform a method comprising:
obtaining, from a first communication network, information of a cell layout of the first communication network;
obtaining, from a repository, information of a geographically defined reservation zone, wherein an incumbent shares, according to authorized shared access, spectrum available in the geographically defined reservation zone with a plurality of communication networks including the first communication network;
determining a zone mapping table which maps the geographically defined reservation zone to at least one cell of the first communication network, thereby avoiding a need of the first communication network to reveal its cell layout information to the incumbent or other communication network;
obtaining, from the repository, a spectrum usage status of the geographically defined reservation zone;
mapping, based on the zone mapping table, the geographically defined reservation zone to at least one cell of the first communication network;

identifying, based on a predefined cell mapping table, at least one cell device related to the at least one cell; and triggering issuing a command to the at least one cell device to modify an activity status of a predefined radio resource in the at least one cell depending on the spectrum usage status.

14. The computer program product according to claim 13, wherein the radio resource comprises at least one of:

a frequency;

a time slot; and a code.

15. The computer program product according to claim 13, wherein the activity status is at least one of:

transmitting on the radio resource being allowed in the cell, transmitting on the radio resource being forbidden in the cell;

receiving on the radio resource being allowed in the cell, receiving on the radio resource being forbidden in the cell;

a maximum transmit power level of the radio resource allowed for transmitting in the cell;

a minimum receive power level of the radio resource allowed for being received in the cell; and a tilt of a transmit antenna providing the radio resource to the cell, and a tilt of a receive antenna receiving the radio resource from the cell.

16. The computer program product according to claim 13, wherein the at least one cell device is one of:

a base station of the communication network; and a terminal device of the communication network.

17. The computer program product according to claim 13, the apparatus being further caused to perform at least one of the following:

receiving the spectrum usage status from a repository device, and generating the spectrum usage status based on a predefined event.

18. The computer program product according to claim 13, wherein the set of instructions is further configured to cause the apparatus to perform:

informing the repository about the spectrum usage status of the first communication network in the geographically defined reservation zone.

\* \* \* \* \*

UNITED STATES PATENT AND TRADEMARK OFFICE
CERTIFICATE OF CORRECTION

PATENT NO.        : 9,769,672 B2
APPLICATION NO.   : 14/911552
DATED             : September 19, 2017
INVENTOR(S)       : Markwart et al.

It is certified that error appears in the above-identified patent and that said Letters Patent is hereby corrected as shown below:

On the Title Page

Column 2, Item (57), under "ABSTRACT", Line 5, delete "and triggering" and insert therefor -- and, triggering --.

Signed and Sealed this
Twenty-fourth Day of April, 2018

Andrei Iancu
*Director of the United States Patent and Trademark Office*